US011924313B2

(12) United States Patent
Patrick et al.

(10) Patent No.: US 11,924,313 B2
(45) Date of Patent: Mar. 5, 2024

(54) MULTIPLE PROTOCOL HEADER PROCESSING

(71) Applicant: Micron Technology, Inc., Boise, ID (US)

(72) Inventors: David Patrick, McKinney, TX (US); Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/865,141

(22) Filed: Jul. 14, 2022

(65) Prior Publication Data

US 2022/0360649 A1   Nov. 10, 2022

Related U.S. Application Data

(63) Continuation of application No. 17/007,748, filed on Aug. 31, 2020, now Pat. No. 11,412,075.

(51) Int. Cl.
*H04L 69/22*  (2022.01)
*H04L 47/2441*  (2022.01)
*H04L 69/16*  (2022.01)

(52) U.S. Cl.
CPC .......... *H04L 69/22* (2013.01); *H04L 47/2441* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 5,265,207 A | * | 11/1993 | Zak ................... G06F 15/17343 |
| | | | 712/15 |
| 6,404,737 B1 | | 6/2002 | Novick et al. |
| 6,650,660 B1 | | 11/2003 | Koehler et al. |
| 7,477,637 B2 | | 1/2009 | Koehler et al. |
| 7,613,209 B1 | | 11/2009 | Nguyen et al. |
| 8,255,567 B2 | | 8/2012 | Mizrachi et al. |
| 9,495,194 B1 | | 11/2016 | Twitchell, Jr. et al. |
| 9,667,560 B2 | | 5/2017 | Sreeramoju |

(Continued)

FOREIGN PATENT DOCUMENTS

| | | |
|---|---|---|
| WO | WO-2017196143 A1 | 11/2017 |
| WO | WO-2019178813 A1 | 9/2019 |

(Continued)

OTHER PUBLICATIONS

"International Application Serial No. PCT/US2021/038657, International Search Report dated Oct. 5, 2021", 3 pgs.

(Continued)

*Primary Examiner* — James A Edwards
(74) *Attorney, Agent, or Firm* — Schwegman Lundberg & Woessner, P.A.

(57) ABSTRACT

Implementations of the present disclosure are directed to systems and methods for processing headers that support multiple protocols. A header of a packet includes a bridge type (BTYPE) field that indicates the protocol of the packet. A command field of the packet is interpreted differently based on the value of the BTYPE field. Among the benefits of implementations of the present disclosure is that a single network may be used to carry packets of different protocols without the overhead of encapsulation.

24 Claims, 8 Drawing Sheets

(56) References Cited

U.S. PATENT DOCUMENTS

| | | | |
|---|---|---|---|
| 9,800,514 B1 | 10/2017 | Chen et al. | |
| 9,946,462 B1 | 4/2018 | Li et al. | |
| 10,216,537 B2 | 2/2019 | Twitchell, Jr. et al. | |
| 10,419,990 B2 | 9/2019 | Uemura et al. | |
| 10,509,764 B1* | 12/2019 | Izenberg | H04L 67/1097 |
| 10,707,875 B1* | 7/2020 | Orthner | H03K 19/17756 |
| 11,075,647 B2 | 7/2021 | Rigo et al. | |
| 11,296,995 B2 | 4/2022 | Brewer | |
| 11,360,920 B2 | 6/2022 | Patrick et al. | |
| 11,412,075 B2 | 8/2022 | Patrick et al. | |
| 11,418,455 B2 | 8/2022 | Brewer | |
| 11,539,623 B2 | 12/2022 | Brewer | |
| 11,570,285 B2 | 1/2023 | Li et al. | |
| 2003/0012192 A1 | 1/2003 | Dore et al. | |
| 2004/0013117 A1* | 1/2004 | Hendel | H04L 49/901 370/474 |
| 2005/0047439 A1 | 3/2005 | Madajczak | |
| 2005/0251612 A1 | 11/2005 | Creta et al. | |
| 2007/0110053 A1 | 5/2007 | Soni et al. | |
| 2008/0232364 A1* | 9/2008 | Beverly | H04L 69/18 370/389 |
| 2008/0310427 A1 | 12/2008 | West | |
| 2009/0037671 A1* | 2/2009 | Bower | H04L 49/901 711/170 |
| 2009/0261996 A1 | 10/2009 | Itoh | |
| 2010/0153658 A1 | 6/2010 | Duncan et al. | |
| 2011/0072177 A1 | 3/2011 | Glasco et al. | |
| 2011/0078222 A1 | 3/2011 | Wegener | |
| 2012/0033563 A1* | 2/2012 | Jazra | H04L 47/2441 370/252 |
| 2012/0159037 A1 | 6/2012 | Kwon et al. | |
| 2013/0028261 A1 | 1/2013 | Lee | |
| 2013/0051385 A1 | 2/2013 | Jayasimha et al. | |
| 2013/0103783 A1 | 4/2013 | Mannava et al. | |
| 2013/0142066 A1 | 6/2013 | Yamaguchi et al. | |
| 2013/0325378 A1* | 12/2013 | Allen-Ware | G06F 1/329 702/61 |
| 2014/0010364 A1 | 1/2014 | Shibutani et al. | |
| 2014/0365632 A1 | 12/2014 | Ishii et al. | |
| 2014/0369355 A1 | 12/2014 | Hori | |
| 2015/0010005 A1 | 1/2015 | Yoshida et al. | |
| 2015/0052283 A1 | 2/2015 | Ishii et al. | |
| 2015/0109024 A1 | 4/2015 | Abdelfattah et al. | |
| 2015/0242261 A1 | 8/2015 | Yamaguchi et al. | |
| 2016/0255048 A1 | 9/2016 | Ganesh et al. | |
| 2017/0064544 A1 | 3/2017 | Youn et al. | |
| 2017/0255582 A1 | 9/2017 | Harriman et al. | |
| 2017/0310473 A1 | 10/2017 | Takiguchi et al. | |
| 2017/0322841 A1 | 11/2017 | Morris et al. | |
| 2018/0011759 A1 | 1/2018 | Willey et al. | |
| 2018/0097722 A1 | 4/2018 | Callard | |
| 2018/0307597 A1 | 10/2018 | Oh et al. | |
| 2019/0097748 A1* | 3/2019 | Loprieno | H04L 1/0041 |
| 2019/0171604 A1 | 6/2019 | Brewer | |
| 2019/0243700 A1* | 8/2019 | Brewer | G11C 7/1045 |
| 2019/0324928 A1 | 10/2019 | Brewer | |
| 2019/0332555 A1 | 10/2019 | Mcvay | |
| 2019/0340019 A1 | 11/2019 | Brewer | |
| 2019/0340020 A1 | 11/2019 | Brewer | |
| 2019/0340023 A1 | 11/2019 | Brewer | |
| 2019/0340024 A1 | 11/2019 | Brewer | |
| 2019/0340027 A1 | 11/2019 | Brewer | |
| 2019/0340035 A1 | 11/2019 | Brewer | |
| 2019/0340154 A1 | 11/2019 | Brewer | |
| 2019/0340155 A1 | 11/2019 | Brewer | |
| 2020/0151137 A1 | 5/2020 | Izenberg et al. | |
| 2020/0162191 A1 | 5/2020 | Yu et al. | |
| 2020/0274552 A1 | 8/2020 | Rigo et al. | |
| 2020/0380121 A1 | 12/2020 | Pasricha et al. | |
| 2021/0014179 A1 | 1/2021 | Luo et al. | |
| 2021/0142448 A1 | 5/2021 | Yao et al. | |
| 2021/0297354 A1 | 9/2021 | Zemach et al. | |
| 2022/0066969 A1 | 3/2022 | Patrick et al. | |
| 2022/0070096 A1 | 3/2022 | Brewer | |
| 2022/0070105 A1 | 3/2022 | Brewer | |
| 2022/0070106 A1 | 3/2022 | Brewer | |
| 2022/0070284 A1 | 3/2022 | Patrick et al. | |
| 2022/0191149 A1 | 6/2022 | Brewer | |
| 2022/0269633 A1 | 8/2022 | Patrick et al. | |
| 2022/0360540 A1 | 11/2022 | Brewer | |
| 2023/0097722 A1 | 3/2023 | Brewer | |

FOREIGN PATENT DOCUMENTS

| | | |
|---|---|---|
| WO | WO-2022046260 A1 | 3/2022 |
| WO | WO-2022046261 A1 | 3/2022 |
| WO | WO-2022046262 A1 | 3/2022 |
| WO | WO-2022046263 A1 | 3/2022 |
| WO | WO-2022046264 A1 | 3/2022 |

OTHER PUBLICATIONS

"International Application Serial No. PCT/US2021/038657, Written Opinion dated Oct. 5, 2021", 4 pgs.

"International Application Serial No. PCT/US2021/038669, International Search Report dated Oct. 5, 2021", 4 pgs.

"International Application Serial No. PCT/US2021/038669, Written Opinion dated Oct. 5, 2021", 5 pgs.

"International Application Serial No. PCT/US2021/038683, International Search Report dated Oct. 5, 2021", 3 pgs.

"International Application Serial No. PCT/US2021/038683, Written Opinion dated Oct. 5, 2021", 6 pgs.

"International Application Serial No. PCT/US2021/038689, International Search Report dated Oct. 14, 2021", 3 pgs.

"International Application Serial No. PCT/US2021/038689, Written Opinion dated Oct. 14, 2021", 5 pgs.

"International Application Serial No. PCT/US2021/038698, International Search Report dated Oct. 1, 2021", 3 pgs.

"International Application Serial No. PCT/US2021/038698, Written Opinion dated Oct. 1, 2021", 5 pgs.

"WikiChip Fuse", (Jan. 4, 2020), 9 pgs.

"International Application Serial No. PCT/US2021/038657, International Preliminary Report on Patentability dated Mar. 9, 2023", 6 pgs.

"International Application Serial No. PCT/US2021/038669, International Preliminary Report on Patentability dated Mar. 9, 2023", 7 pgs.

"International Application Serial No. PCT/US2021/038683, International Preliminary Report on Patentability dated Mar. 9, 2023", 8 pgs.

"International Application Serial No. PCT/US2021/038689, International Preliminary Report on Patentability dated Mar. 9, 2023", 7 pgs.

"International Application Serial No. PCT/US2021/038698, International Preliminary Report on Patentability dated Mar. 9, 2023", 7 pgs.

* cited by examiner

US 11,924,313 B2

MULTIPLE PROTOCOL HEADER PROCESSING

PRIORITY APPLICATION

This application is a continuation of U.S. application Ser. No. 17/007,748, filed Aug. 31, 2020, which is incorporated herein by reference in its entirety.

STATEMENT REGARDING GOVERNMENT SUPPORT

This invention was made with U.S. Government support under Agreement No. HR00111830003, awarded by DARPA. The U.S. Government has certain rights in the invention.

TECHNICAL FIELD

Embodiments of the disclosure relate generally to network protocols and more specifically to networking using headers to distinguish between multiple protocols supported by a network.

BACKGROUND

A network supports a particular protocol and interprets packets according to a packet format defined for the protocol. Fields for the packet are in predefined locations within the packet and are interpreted consistently for all packets. For example, Internet Protocol (IP) networks us an IP header with a 4-bit version field, and 4-bit Internet header length field, a 6-bit differentiated services code point field, a 2-bit explicit congestion notification field, and a 16-bit total length field, appearing in that order in the first 32 bits of each IP packet.

Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property blocks) on one substrate (e.g., single die), such as a system-on-a-chip (SoC), or discretely packaged devices integrated on a board. In general, chiplets provide better performance (e.g., lower power consumption, reduced latency, etc.) than discretely packaged devices, and chiplets provide greater production benefits than single die chips. These production benefits can include higher yields or reduced development costs and time.

Chiplet systems are generally made up of one or more application chiplets and support chiplets. Here, the distinction between application and support chiplets is simply a reference to the likely design scenarios for the chiplet system. Thus, for example, a synthetic vision chiplet system can include an application chiplet to produce the synthetic vision output along with support chiplets, such as a memory controller chiplet, sensor interface chiplet, or communication chiplet. In a typical use case, the synthetic vision designer can design the application chiplet and source the support chiplets from other parties. Thus, the design expenditure (e.g., in terms of time or complexity) is reduced by avoiding the design and production of functionality embodied in the support chiplets. Chiplets also support the tight integration of IP blocks that can otherwise be difficult, such as those using different feature sizes. Thus, for example, devices designed during a previous fabrication generation with larger feature sizes, or those devices in which the feature size is optimized for the power, speed, or heat generation—as can happen with sensors—can be integrated with devices having different feature sizes more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Implementations of the present disclosure are directed to systems and methods for processing headers that support multiple protocols. A header of a packet includes a bridge type (BTYPE) field that indicates the protocol of the packet. A command field of the packet is interpreted differently based on the value of the BTYPE field.

Among the benefits of implementations of the present disclosure is that a single network may be used to carry packets of different protocols without the overhead of encapsulation. This allows existing networks that support an existing protocol to support a new protocol without modification of existing network clients. Processing cycles expended in transferring, receiving, and de-encapsulating encapsulation data are reduced. Additionally, power consumed in performing the processing is reduced. Performance of the system comprising the communicating devices is also improved as a result of the reduced networking overhead. Other benefits will be evident to those of skill in the relevant art having the benefit of this disclosure.

Figure 1A:
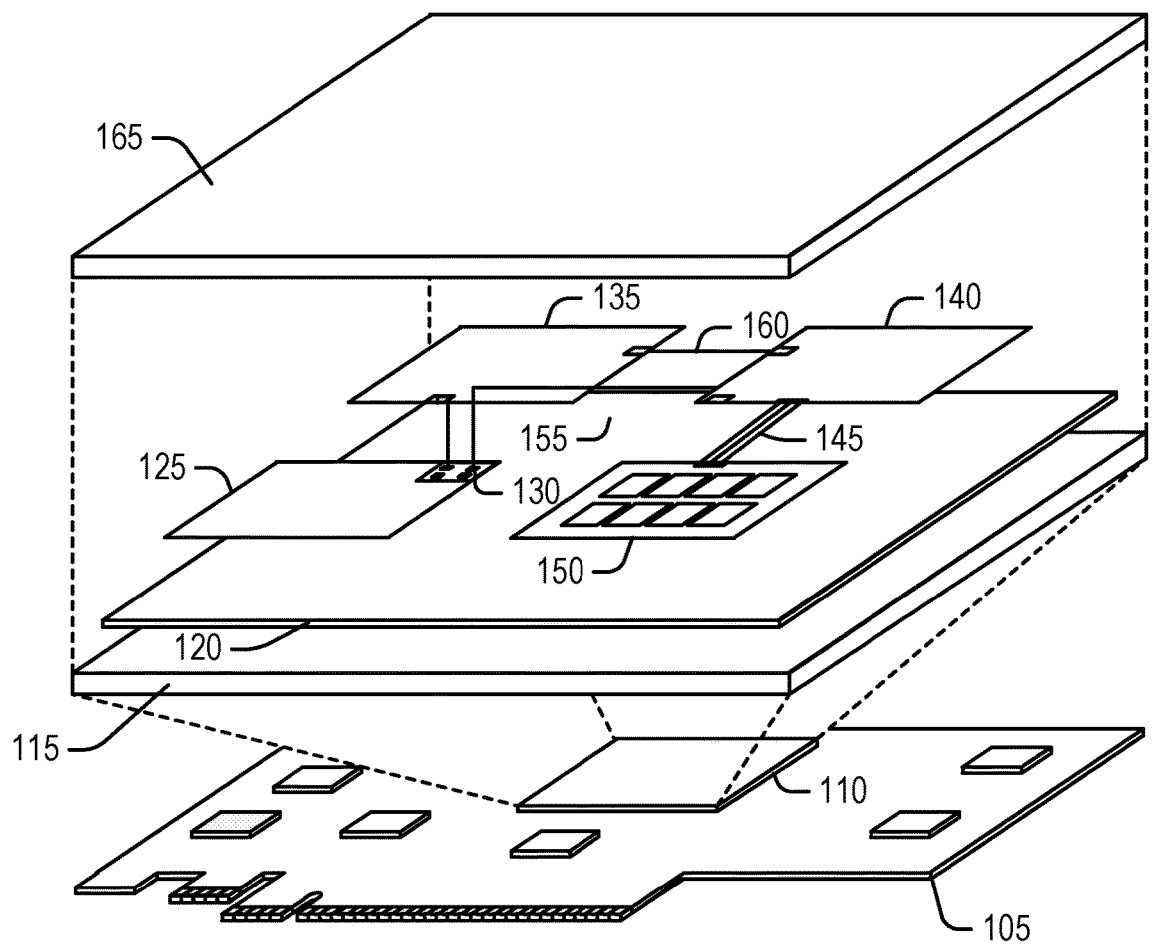
FIGS. 1A and 1B illustrate an example of a chiplet system, according to an embodiment.
Figure 1B:
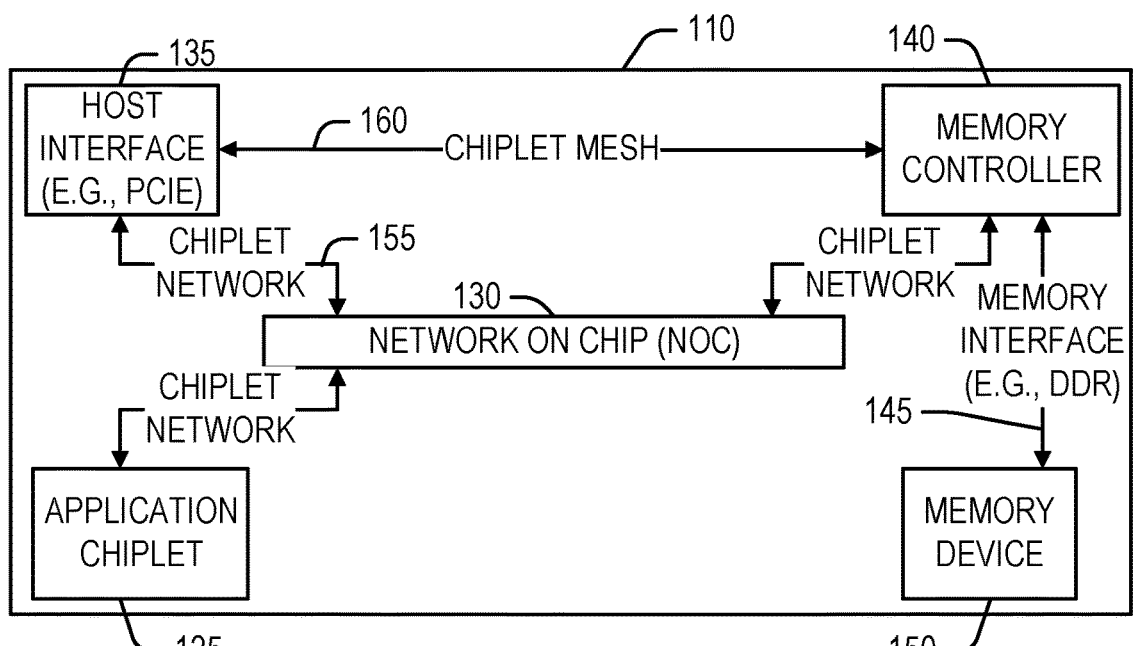

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets: an application chiplet 125, a host interface chiplet 135, a memory controller chiplet 140, and a memory device chiplet 150. Other systems may include many additional chiplets to provide additional functionalities, as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments, NOC 130 may be included on the application chiplet 125. In an example, NOC 130 may be defined in response to selected support chiplets (e.g., chiplets 135, 140, and 150), thus enabling a designer to select an appropriate number of chiplet network connections or switches for the NOC 130. In an example, the NOC 130 can be located on a separate chiplet or even within the interposer 120. In examples as discussed herein, the NOC 130 implements a CPI network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, and so forth. Within a single chip, these options are generally selected to meet design goals, such as power consumption, speed, and so forth. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections or drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, ... ), and multiples of 40 bits for DDR mode: (40, 80, 120, ... ). The AIB channel width includes both transmit (TX) and receive (RX) signals. The channel can be configured to have a symmetrical number of TX and RX input/outputs (I/Os), or have a non-symmetrical number of transmitters and receivers (e.g., either all transmitters or all receivers). The channel can act as an AIB master or slave depending on which chiplet provides the master clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e., 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary (AUX) channel. The AUX channel contains signals used for AIB initialization. All AIB channels (other than the AUX channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender to allow transmitting of additional information.

Also illustrated is a chiplet mesh network 160 that uses a direct, chiplet-to-chiplet technique without the need for the NOC 130. The chiplet mesh network 160 can be implemented in CPI or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system) can be through a desired interface (for example, a PCIE interface). Such an external interface may be implemented, in an example, through a host interface chiplet 135, which in the depicted example provides a PCIE interface external to chiplet system 110. Such dedicated interfaces 145 are generally employed when a convention or standard in the industry has converged on such an interface. The illustrated example of a DDR interface 145 connecting the memory controller chiplet 140 to a dynamic random access memory (DRAM) memory device chiplet 150 is just such an industry convention.

Of the variety of possible support chiplets, the memory controller chiplet 140 is likely present in the chiplet system 110 due to the near omnipresent use of storage for computer processing as well as being sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device chiplet 150, such as garbage collection in negative-and (NAND) flash or storage class memories and temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh, may be controlled by a host processor or a memory controller at some times, and at other times be controlled by the DRAM memory device or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, with the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the command's success to the application chiplet 125. Atomic operations avoid transmitting the data across the chiplet mesh network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can run on a programmable atomic unit (PAU) (e.g., a custom atomic unit (CAU)) of the memory controller chiplet 140. FIG. 1 illustrates an example of a memory controller chiplet that comprises a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), and graphics double data rate type 6 SDRAM (GDDR6 SDRAM), among others. Examples of non-volatile memory devices include, but are not limited to, NAND-type flash memory, storage class memory (e.g., phase-change memory or memristor based technologies), and ferroelectric RAM (FeRAM), among others. The illustrated example includes the memory device as the memory device chiplet 150; however, the memory device can reside elsewhere, such as in a different package on the board 105. For many applications, multiple memory device chiplets may be provided. In an example, these memory device chiplets may each implement one or multiple storage technologies. In an example, a memory chiplet may include multiple stacked memory die of different technologies (for example, one or more SRAM devices stacked or otherwise in communication with one or more DRAM devices). Memory controller chiplet 140 may also serve to coordinate operations between multiple memory chiplets in chiplet system 110 (for example, to utilize one or more memory chiplets in one or more levels of cache storage and to use one or more additional memory chiplets as main memory). Chiplet system 110 may also include multiple memory controller chiplets 140, as may be used to provide memory control functionality for separate processors, sensors, networks, and so forth. A chiplet architecture, such as chiplet system 110, offers advantages in allowing adaptation to different memory storage technologies and different memory interfaces, through updated chiplet configurations, without requiring redesign of the remainder of the system structure.

Figure 2:
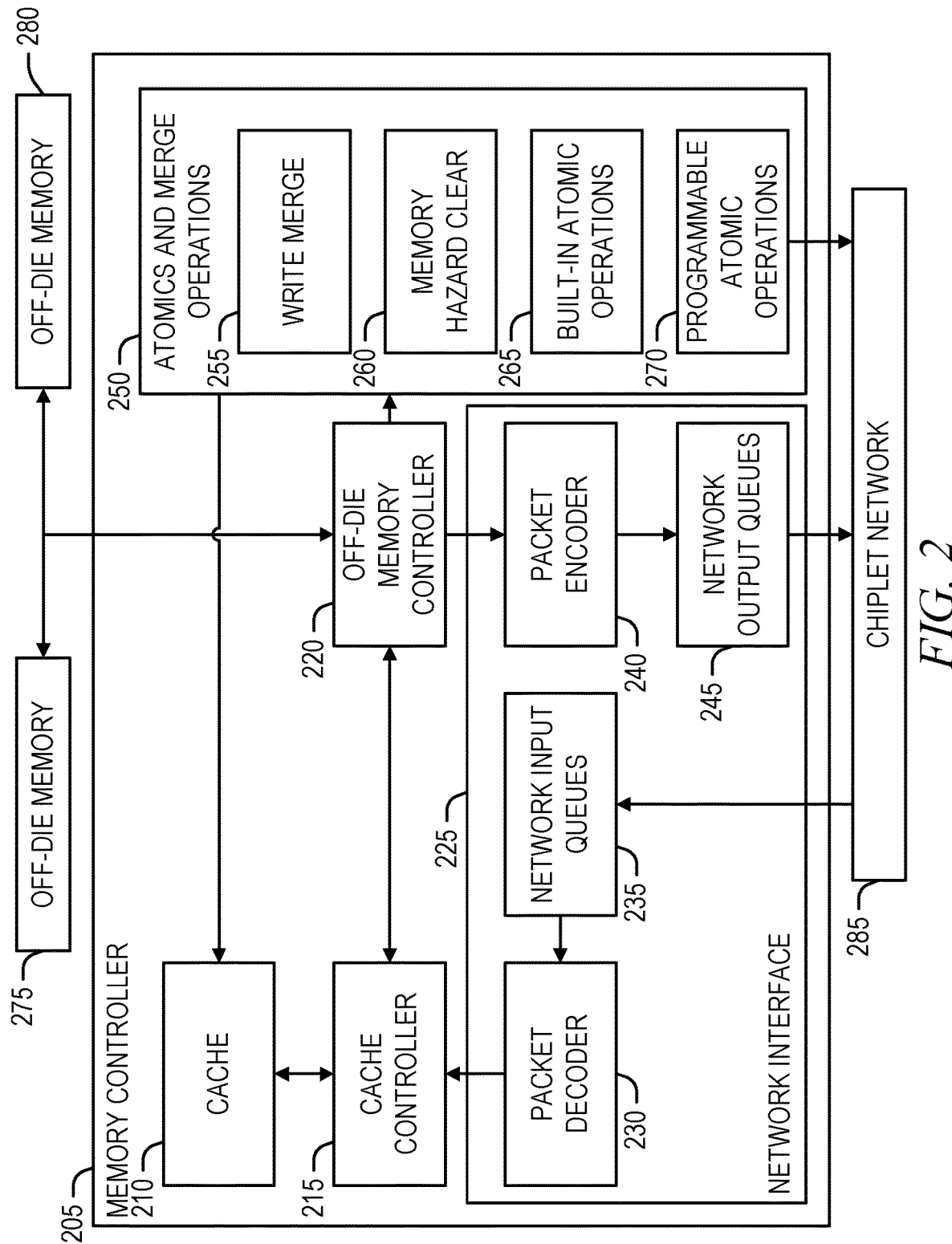
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 175), a network communication interface 225 (e.g., to interface with a chiplet network 180 and communicate with other chiplets), and a set of atomic and merge operations units 250. Members of this set can include, for example, a write merge unit 255, a hazard clear unit 260, built-in atomic unit 265, or a PAU 270. The various components are illustrated logically and not as they necessarily would be implemented. For example, the built-in atomic unit 265 likely comprises different devices along a path to the off-die memory. For example, the built-in atomic unit could be in an interface device/buffer on a memory chiplet, as discussed above. In contrast, the PAU 270 are likely implemented in a separate processor on the memory controller chiplet 205 (but in various examples may be implemented in other locations, for example on a memory chiplet).

The off-die memory controller 220 is directly coupled to an off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge operations units 250 and for input to the cache controller 215 (e.g., a memory side cache controller).

In the example configuration, cache controller 215 is directly coupled to the cache 210, and may be coupled to the network communication interface 225 for input (such as incoming read or write requests) and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration or a mesh network providing for additional connections, depending upon the configuration.

The packet decoder 230 may convert a received packet into a memory command (e.g., a read command, a write command, a burst read or write, an atomic operation, or any suitable combination thereof) for the memory controller 205. The command may be selected based on a protocol of the packet. For example, a particular value of a command field may be interpreted as a first command for a first protocol and a second command for a second protocol.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge operations units 250, or both. As noted above, one or more levels of cache may also be implemented in off-die memories 275 or 280, and in some such examples may be accessed directly by cache controller 215. Data read by the off-die memory controller 220 can be cached in the cache 210 by the cache controller 215 for later use.

The atomic and merge operations units 250 are coupled to receive (as input) the output of the off-die memory controller 220, and to provide output to the cache 210, the network communication interface 225, or directly to the chiplet network 285. The memory hazard clear (reset) unit 260, write merge unit 255, and the built-in (e.g., predetermined) atomic operations unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry and various state machines with other combinational logic circuitry or other logic circuitry, and can also include one or more registers, buffers, or memories to store addresses, executable instructions, operand and other data, or can be implemented as a processor.

The write merge unit 255 receives read data and request data and merges the request data and read data to create a single unit having the read data and the source address to be used in the response or return data packet. The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operation, the built-in atomic operations unit 265 receives the request and reads data, either from the write merge unit 255 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 285.

The built-in atomic operations unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and, optionally, up to 32-bytes of data. The atomic operation performs the read-modify-write to a cache memory line of the cache 210, filling the cache memory if necessary. The atomic operator response can be a simple completion response or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics, such as fetch-and-increment or compare-and-swap, which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic operation unit 265 to perform the requested atomic operation. Following the atomic operation, in addition to providing the resulting data to the data packet encoder 240 to encode outgoing data packets for transmission on the chiplet network 285, the built-in atomic operation unit 265 provides the resulting data to the write merge unit 255, which will also write the resulting data to the cache 210. Following the writing of the resulting data to the cache 210, any corresponding hazard bit which was set will be cleared by the memory hazard clear unit 260.

The PAU 270 enables high performance (high throughput and low latency) for programmable atomic operations (also referred to as "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation to ensure that no other operation (read, write, or atomic) is performed on that memory line, which hazard bit is then cleared upon completion of the atomic operation. Additional direct data paths provided for the PAU 270 executing the programmable atomic operations allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache controller 215.

In selected examples, the approach taken for programmable atomic operations is to provide multiple custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operation; (2) can perform load and stores to memory, arithmetic and logical operations, and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will release a pending read or write request involving the designated (or reserved) cache line, providing the pending read or write request to an inbound request multiplexer for selection and processing.

Figure 3:
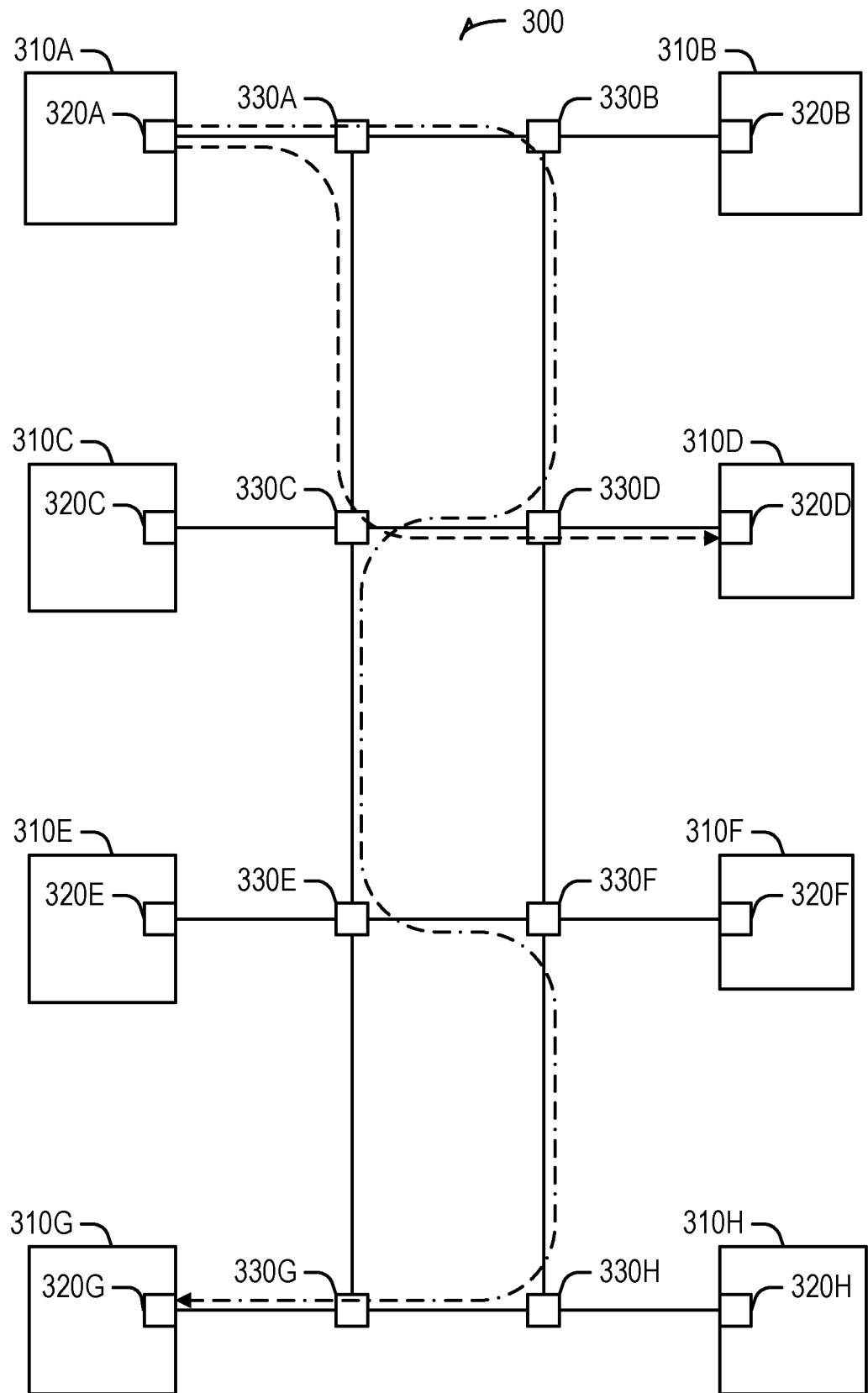
FIG. 3 illustrates an example of routing between chiplets using a chiplet protocol interface (CPI) network, according to an embodiment.

FIG. 3 illustrates an example of routing between chiplets in a chiplet layout 300 using a CPI network, according to an embodiment. The chiplet layout 300 includes chiplets 310A, 310B, 310C, 310D, 310E, 310F, 310G, and 310H. The chiplets 310A-310H are interconnected by a network comprising nodes 330A, 330B, 330C, 330D, 330E, 330F, 330G, and 330H. Each of the chiplets 310A-310H includes a hardware transceiver, labeled 320A-320H.

CPI packets can be transferred between the chiplets 310 using an AIB. The AIB provides physical layer functionality. The physical layer transmits and receives data using source synchronous data transfers with a forwarded clock. Packets are transferred across the AIB at SDR or DDR with respect to the transmitted clock. Various channel widths are supported by the AIB. AIB channel widths are in multiples of 20 bits when operated in SDR mode (20, 40, 60, . . . ), and 40 bits for DDR mode (40, 80, 120, . . . ). The AIB channel width includes both TX and RX signals. The channel may be configured to have a symmetrical number of TX and RX (I/Os or have a non-symmetrical number of transmitters and receivers (e.g., either all transmitters or all receivers). The channel may act as an AIB master or slave depending on which chiplet provides the master clock.

The AIB adapter provides an interface to the AIB link layer and an interface to the AIB physical layer (PHY). The AIB adapter provides data staging registers, power-on reset sequencers, and a control signal shift register.

The AIB physical layer consists of AIB I/O Cells. AIB I/O cells (implemented, in some example embodiments, by the hardware transceivers 320) may be input only, output only, or bidirectional. An AIB channel is composed of a set of AIB I/O cells and the number of cells is dependent on the configuration of the AIB channel. The receive signals on one chiplet are connected to the transmit signals on the paired chiplet. In some example embodiments, each column comprises an AUX channel and data channels numbered 0 to N.

AIB channels are typically configured as half TX data plus half RX data, all TX data, or all RX data plus associated clocks and miscellaneous control. The number of TX versus RX data signals is determined at design time and cannot be configured as part of system initialization, in some example embodiments.

The CPI packet protocols (point-to-point and routable) use symmetrical receive and transmit I/O cells within an AIB channel. The CPI streaming protocol allows more flexible use of the AIB I/O cells. An AIB channel for streaming mode may configure the I/O cells as all TX, all RX, or half TX and half RX, in some example embodiments.

Data packets are routed among the chiplets 310 by the network nodes 330. A node 330 may determine the next node 330 to forward a received data packet to based on one or more data fields of the data packet. For example, a source or destination address, source or destination port, virtual channel, or any suitable combination thereof may be hashed to select a successive network node or an available network path. Selecting paths in this way may serve to balance network traffic.

Thus, in FIG. 3, a data path is shown from the chiplet 310A to the chiplet 310D. The data packet is sent by the hardware transceiver 320A to the network node 330A; forwarded by the network node 330A to the network node 330C; forwarded by the network node 330C to the network node 330D; and delivered by the network node 330D to the hardware transceiver 320D of the chiplet 310D.

A second data path is also shown in FIG. 3, from the chiplet 310A to the chiplet 310G. The data packet is sent by the hardware transceiver 320A to the network node 330A; forwarded by the network node 330A to the network node 330B; forwarded by the network node 330B to the network node 330D; forwarded by the network node 330D to the network node 330C; forwarded by the network node 330C to the network node 330E; forwarded by the network node 330E to the network node 330F; forwarded by the network node 330F to the network node 330H; forwarded by the network node 330H to the network node 330G; and delivered by the network node 330G to the hardware transceiver 320G of the chiplet 310G. As is visually apparent in FIG. 3, multiple paths through the network are available for transmission of data between any pair of chiplets.

AIB I/O cells support three clocking modes: asynchronous (i.e., non-clocked), SDR, and DDR. The non-clocked mode is used for clocks and some control signals. The SDR mode may use dedicated SDR only I/O cells or dual use SDR/DDR I/O cells.

CPI packet protocols (point-to-point and routable) may use an AIB channel in either SDR or DDR operation modes. In some example embodiments, the AIB channel is in increments of 80 I/O cells (i.e. 40 TX and 40 RX) for SDR mode and 40 I/O cells for DDR mode.

CPI streaming protocol may use an AIB channel in either SDR or DDR operation modes. In some example embodiments, for both modes (SDR and DDR), the AIB channel is in increments of 40 I/O cells.

Each AIB channel is assigned a unique interface identifier. The identifier is used during CPI reset and initialization to determine paired AIB channels across adjacent chiplets. In some example embodiments, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

In some example embodiments, AIB channels are numbered in continuous increasing order starting with the AIB channel adjacent to the AUX channel. The AIB channel adjacent to the AUX is defined to be AIB channel zero.

FIG. 3, by way of example, shows eight chiplets 310 connected by a network comprising eight nodes 330. More or fewer chiplets 310 and more or fewer nodes 330 may be included in the chiplet network, allowing a network of chiplets of arbitrary size to be created.

Figure 4:
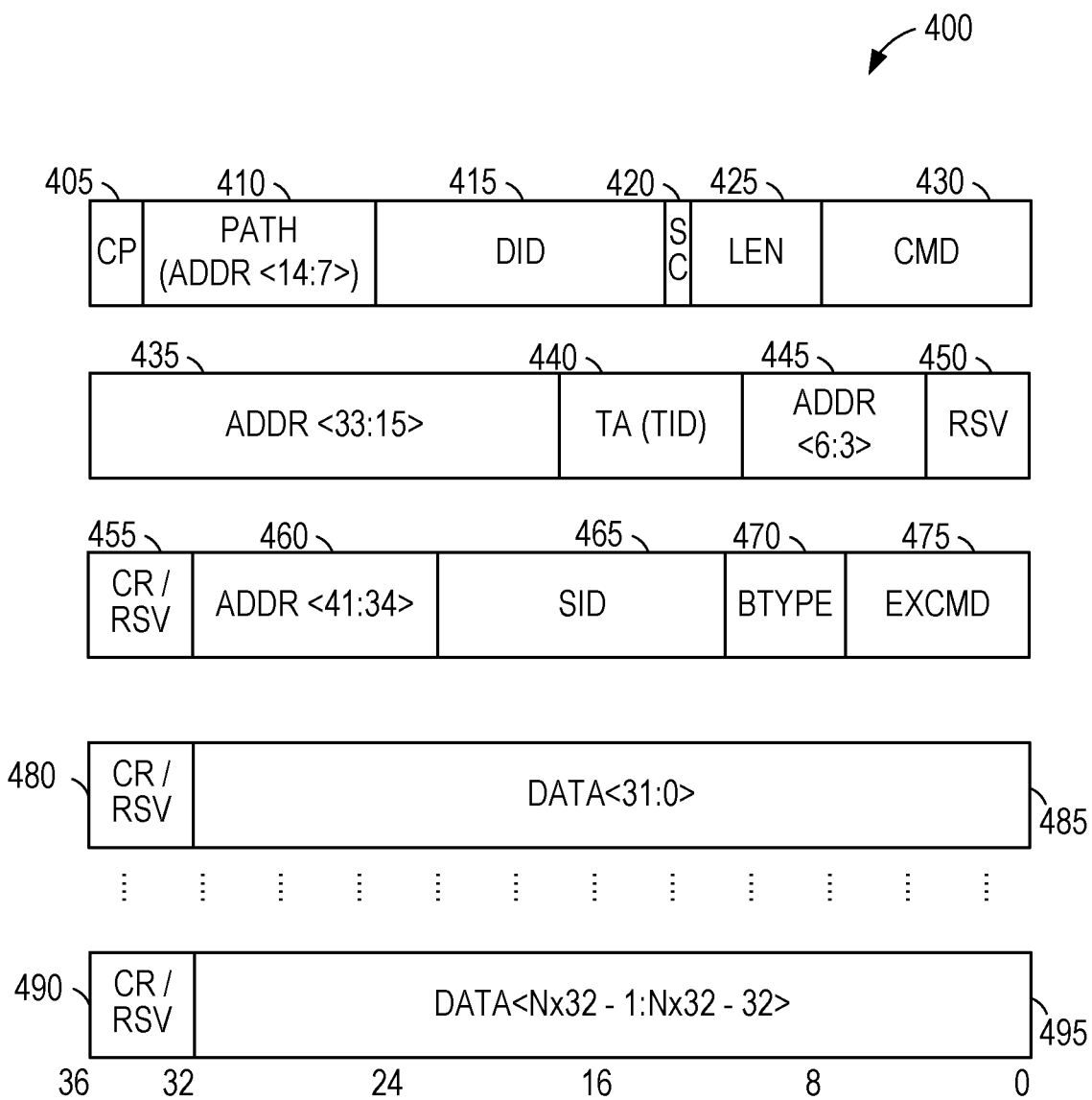
FIG. 4 is a block diagram of a data packet comprising multiple flow control units (flits), in accordance with some embodiments of the present disclosure.

FIG. 4 is a block diagram of a data packet 400 comprising multiple flits, in accordance with some embodiments of the present disclosure. The data packet 400 is divided into flits, each of which is composed of 36 bits. The first flit of the data packet 400 includes control path field 405, path field 410, destination identifier (DID) field 415, sequence continue (SC) field 420, length field 425, and command field 430. The second flit includes address fields 435 and 445, a transaction id (TID) field 440, and reserved (RSV) field 450. The third flit includes credit return (CR)/RSV field 455, address field 460, source identifier (SID) 465, bridge type (BTYPE) 470, and extended command (EXCMD) 475. Each remaining flit includes a CR/RSV field (e.g., the CR/RSV fields 480 and 490) and a data field (e.g., the data fields 485 and 495).

The control path field 405 is a two-bit field that indicates whether the CR/RSV field of later flits in the packet contain CR data, RSV data, or should be ignored, and whether the path field 410 should be used to control ordering of packets. In some example embodiments, a value of 0 or 1 in the control path field 405 indicates that the CR/RSV fields 455, 480, 490 contain CR data; a value of 2 or 3 in the control path field 405 indicates that the CR/RSV fields 455, 480, 490 contain RSV data; a value of 0 indicates that the path field 410 is ignored; a value of 1 or 3 indicates that the path field 410 is used to determine the path for the data packet 400; and a value of 2 indicates that single path ordering is to be used. In some example embodiments, a 1-bit field is used. Alternatively, the high bit of the control path field 405 may be considered to be a 1-bit field that controls whether the CR/RSV fields 440, 450 contain CR data or RSV data.

The path field 410 is an eight-bit field. When the control path field 405 indicates that the path field 410 is used to determine the path for a data packet 400, all data packets having the same value for the path field 410 are guaranteed to take the same path through the network. As a result, the order of the data packets will be unchanged between the sender and the receiver. If the control path field 405 indicates that single path ordering is to be used, the path is determined for each packet as though the path field 410 were set to zero. Accordingly, all packets take the same path and the order will be unchanged, regardless of the actual value of the path field 410 of each data packet. If the control path field 405 indicates that the path field 410 is to be ignored, the data packets are routed without regard to the value of the path field 410, and the data packets may be received by the receiver in a different order than they were sent by the sender. This may avoid congestion in the network and allow for greater throughput in the device.

The DID field 415 stores a twelve-bit DID. The DID uniquely identifies a destination in the network (e.g., a destination chiplet). A sequence of data packets all having the SC field 420 set are guaranteed to be delivered in order. The length field 425 is a five-bit field that indicates the number of flits that comprise the data packet 400. Interpretation of the length field 425 may be non-linear. For example, values 0-22 may be interpreted as 0-22 flits in the data packet 400 and values 23-27 may be interpreted as 33-37 flits in the data packet 400 (i.e., 10 more than the indicated value). Other values of the length field 425 may be vendor defined instead of protocol defined.

The command for the data packet 400 is stored in the command field 430, which is a seven-bit field. The command may be a write command, a read command, a predefined atomic operation command, a custom atomic operation command, a read response, an acknowledge response, or a vendor-specific command. Additionally, the command may indicate a virtual channel of the data packet 400. For example, different commands may be used for different virtual channels, or 1, 2, 3, or 4 bits of the seven-bit command field 430 may be used to indicate the virtual channel and the remaining bits may be used to indicate the command. The table below shows the virtual channel based on the protocol and the command, according to some example embodiments.

| Virtual Channel | CPI Protocol | AXI Protocol |
|---|---|---|
| 0 | Read/Write Requests | Write Requests |
| 1 | Read/Write Responses | Write Responses |
| 2 | Unused | Read Requests |
| 3 | Unused | Read Responses |
| 4 | Priority Read/Write Requests | Priority Write Requests |
| 5 | Priority Read/Write Responses | Priority Write Responses |
| 6 | Unused | Priority Read Requests |
| 7 | Unused | Priority Read Responses |

An address for the command may be indicated in the path field 410, the address fields 435, 445, and 460, or any suitable combination thereof. For example, the high 38 bits of a 4-byte aligned 41-bit address may be indicated by concatenating the address fields 460, 435, 410, and 445 in order (high bits first). The TID field 440 is used to match responses to requests. For example, if a first packet 400 is a read request that identifies a memory location to read, a responsive second packet 400 containing the read data will include the same value in the TID field 440.

The SID field 465 identifies the source of the data packet 400. Accordingly, the recipient of the packet 400 can send a responsive packet by copying the value in the SID field 465 into the DID field 415 of the responsive packet. The 4-bit BTYPE field 470 specifies the command set that is used for the packet 400. A BTYPE of 0 indicates a first method to determine the command of the packet 400 (e.g., a command determined based on the CPI protocol and the command field 430). A BTYPE of 1 indicates a second method to determine the command of the packet 400 (e.g., a command based on the AXI protocol and the EXCMD field 475). Other BTYPE values indicate still other methods of determining the command of the packet 400. For example, a BTYPE of 2 may indicate a command based on the PCIe protocol, wherein the command is determined from format and type fields in the following flit. By prepending (or appending) zeroes to each 32-bit PCIe flit, the PCIe packet may be transferred over the 36-bit CPI network without other modification.

In some example embodiments, if the command field 430 indicates that an extended header is present, the EXCMD field 475 contains the command regardless of the value of the BTYPE field 470. In these example embodiments, the command indicated in the EXCMD field 475 is interpreted according to the value of the BTYPE field 470.

Thus, instead of encapsulating a packet of a second protocol entirely within the data fields of the data packet 400 for transmission over a network using a first protocol, the much lower overhead of adding one or two flits that identify the protocol of the packet 400 allows the network to support multiple protocols (in this example, CPI and AXI or PCIe).

The memory access commands may identify a number of bytes to be written or accessed, a memory space to access (e.g., the off-die memory 275 or an instruction memory for custom atomic operations), or any suitable combination thereof. In some example embodiments, the command may indicate that additional bits of a later flit identify the command. For example, a multi-byte command could be sent by using a vendor-specific command in the seven-bit command field 430 and using a portion or all of the 7-bit extended command (EXCMD) field 475 to contain the larger command. Thus, for certain values of the command field 430, the packet 400 includes only one header flit (e.g., the first header flit shown in FIG. 4, containing fields 405-430). For other values of the command field 430, the packet 400 includes a predetermined additional number of header flits (e.g., two additional header flits as shown in FIG. 4, containing fields 435-475) or a predetermined total number of header flits (e.g., three total header flits as shown in FIG. 4, containing fields 405-475).

If CR is enabled, two bits of the CR/RSV field 445, 480, 490 identify whether the CR is for virtual channel 0, 1, 2, or 3 and the other two bits of the CR/RSV field 445, 480, 490 indicate whether the number of credits to be returned is 0, 1, 2, or 3.

Figure 5:
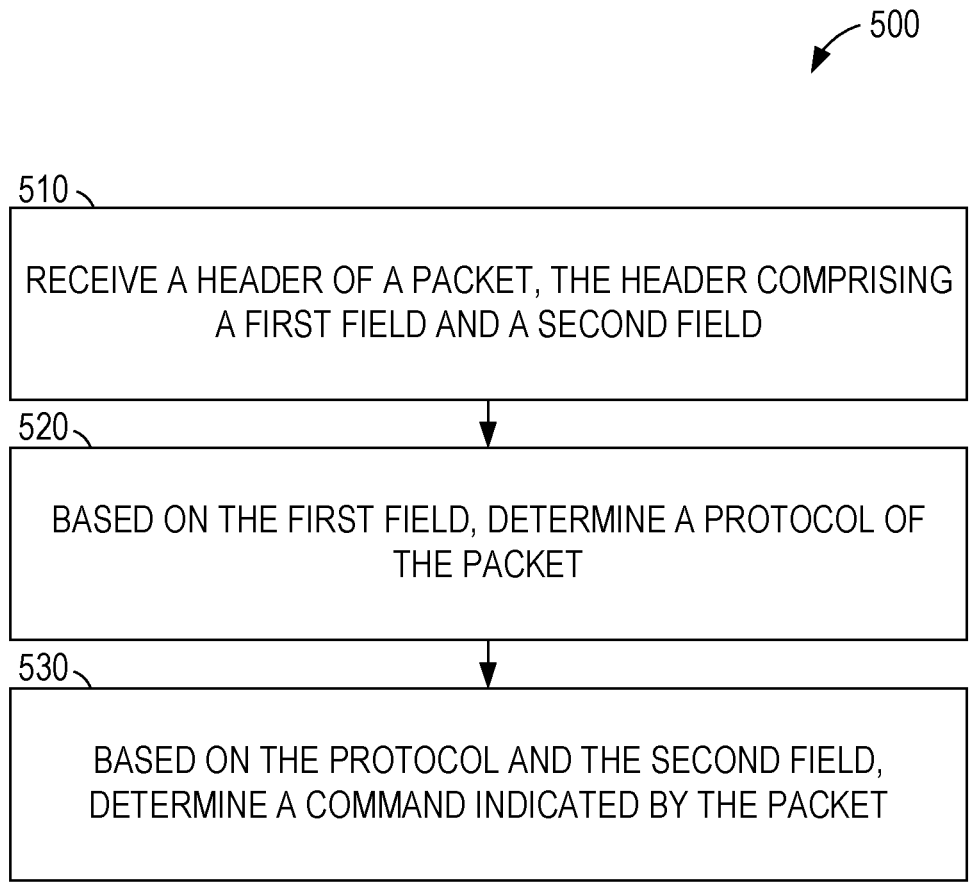
FIG. 5 is a flow chart showing operations of a method performed by a circuit in processing a packet with a header that supports multiple protocols, in accordance with some embodiments of the present disclosure.

FIG. 5 is a flow chart showing operations of a method 500 performed by a circuit in processing a packet with a header that supports multiple protocols, in accordance with some embodiments of the present disclosure. The method 500 includes operations 510, 520, and 530. By way of example and not limitation, the method 500 is described as being performed by the devices of FIGS. 1-3, using the data packets of FIG. 4.

In operation 510, logic (e.g., the memory controller chiplet 205 of FIG. 2 implemented in a CPI network as the chiplet 310D of FIG. 3) receives, from a source (e.g., the chiplet 310A), a packet comprising a first field and a second field. In some example embodiments, the packet is the data packet 400, the first field is the BTYPE field 470, and the second field is the EXCMD field 475. For clarity, it should be understood that, as is apparent from FIG. 4, the above identification of "first field" and "second field" is used merely to identify, but distinguish the two fields from one another; and not to indicate a positioning of the fields within data packet 400.

The logic, in operation 520, determines a protocol of the packet based on the first field. In some example embodiments, if the BTYPE stored in the BTYPE field 470 is 0, the protocol of the packet is CPI and if the BTYPE is 1, the protocol of the packet is AXI. Other BTYPE values may be reserved or vendor-defined.

In operation 530, based on the protocol and the second field, the logic determines a command indicated by the packet. For example, if the protocol is CPI, the command is determined by comparing the value in the EXCMD field 475 to a table of CPI commands. As another example, if the protocol is AXI, the command is determined by comparing the value in the EXCMD field 475 to a table of AXI commands. In some example embodiments, the commands of one supported protocol are a strict subset of the commands of another supported protocol. For example, one protocol may support non-posted write, posted write, configuration write, read, and atomic operations of varying data sizes (e.g., 1, 2, 4, 8, 16, 24, 32, 40, 48, 56, 64, and 128 bytes) while another protocol supports the read and write operations but not atomic operations.

Additional operations may be performed on the packet based on the protocol. For example, a first protocol (e.g., AXI) may include a field in the header that indicates a quality of service (e.g., using a 4-bit value wherein higher values have higher priority) or protection type (e.g., secure or not secure) for the packet while a second protocol (e.g., CPI) may not include these fields or may have one or both fields in different locations in the header. Thus, in some example embodiments, based on the protocol of the packet being the first protocol and the value of a third field that stores an indication of a quality of service, the receiving device may determine a quality of service for the packet. Based on a protocol of a second packet being the second protocol, the third field is ignored and a quality of service is not determined. As another example, based on the protocol of the packet being the first protocol and the value of a third field that stores an indication of a protection type, the receiving device may determine a protection type for the packet. Based on a protocol of a second packet being the second protocol, the third field is ignored and a protection type is not determined.

Packets with higher quality of service may be processed before packets with lower quality of service. Packets with equal quality of service may be processed in the order received, in a round-robin service of virtual channels, or any suitable combination thereof. Packets without quality of service (e.g., packets received using a protocol that does not provide a quality of service field) may be handled as though the quality of service were a predetermined value (e.g., a lowest value, a highest value, or a median value).

Thus, by use of the method 500, a single packet header is enabled to support the command sets of multiple protocols. This enables existing devices that support different protocols to communicate without requiring complete encapsulation of data packets of one format to comply with the network protocol. As a result, computational, network, and memory resources are saved, reducing latency and power consumption.

Figure 6:
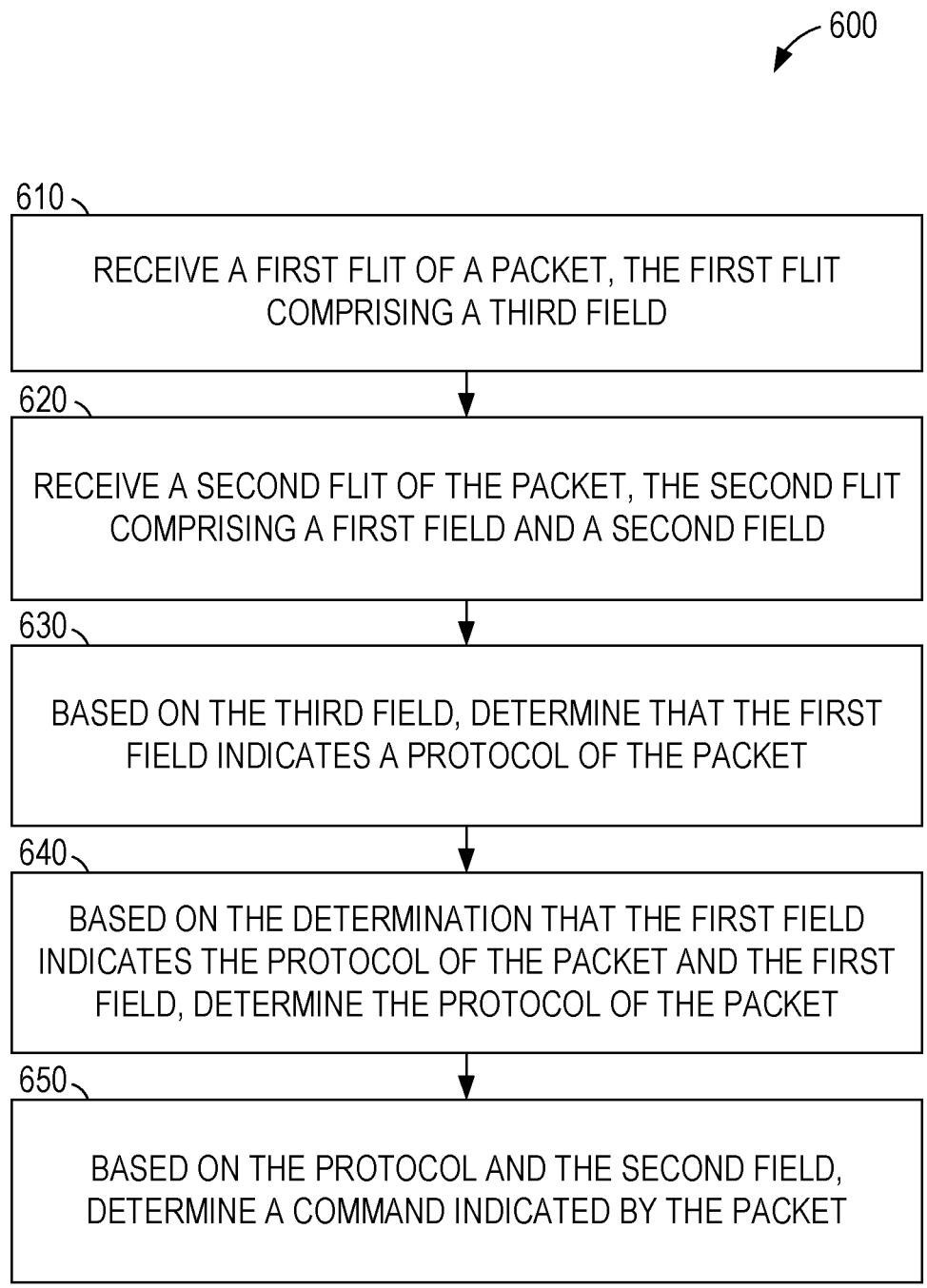
FIG. 6 is a flow chart showing operations of a method performed by a circuit in processing a packet with a header that supports multiple protocols, in accordance with some embodiments of the present disclosure.

FIG. 6 is a flow chart showing operations of a method 600 performed by a circuit in processing a packet with a header that supports multiple protocols, in accordance with some embodiments of the present disclosure. The method 600 includes operations 610, 620, 630, 640, and 650. By way of example and not limitation, the method 600 is described as being performed by the devices of FIGS. 1-3, using the data packet of FIG. 4.

In operation 610, a circuit (e.g., the memory controller chiplet 205 of FIG. 2 implemented in a CPI network as the chiplet 310D of FIG. 3) receives a first flit of a packet, the first flit comprising a third field (e.g., the CMD field 430 of the first flit of the packet 400). For clarity, it should be understood that, as is apparent from FIG. 4, the above identification of "first field," "second field," and "third field" is used merely to identify, but distinguish the three fields from one another; and not to indicate a positioning of the fields within the data packet 400. Likewise, the identification of a "first flit" and a "second flit" is used merely to identify, but distinguish flits from one another, and not to indicate a positioning of the flits within the data packet 400.

The circuit, in operation 620, receives a second flit of the packet, the second flit comprising a first field (e.g., the BTYPE field 470 of another flit of the packet 400) and a second field (the EXCMD field 475).

The circuit determines, based on the third field, that the first field indicates a protocol of the packet (operation 630). For example, in a non-extended packet format, the CMD field 430 may indicate a command in a default protocol but certain values of the CMD field 430 indicate that the packet includes an extended header comprising the BTYPE field 470 and the EXCMD field 475. When interpreting the extended header, the BYTPE field 470 indicates the protocol for the packet and the EXCMD field 475 indicates the command. In some example embodiments, one bit of the CMD field 430 indicates whether the header is extended or not.

In operation 640, the circuit determines, based on the determination that the first field indicates the protocol of the packet and the first field, the protocol of the packet. For example, if the CMD field 430 indicates that an extended header is present and the BTYPE field 470 is 0, the protocol of the packet may be determined to be CPI. Alternatively, if the CMD field 430 indicates that an extended header is present and the BTYPE field 470 is 1, the protocol of the packet may be determined to be AXI.

Based on the protocol and the second field, the circuit determines a command indicated by the packet (operation 650). For example, a particular command value in the EXCMD field 475 may be interpreted as a read command using one protocol and a write command using another protocol, but the intent of the source of the packet (e.g., the chiplet 310A) is correctly discerned by interpreting the command according to the protocol indicated in the BTYPE field 470.

Thus, by use of the method 600, a single packet header is enabled to support the command sets of multiple protocols. This enables existing devices that support different protocols to communicate without requiring complete encapsulation of data packets of one format to comply with the network protocol. As a result, computational, network, and memory resources are saved, reducing latency and power consumption. Additionally, by comparison with the method 500, support for a default protocol is enhanced, reducing the header overhead of packets sent with non-extended headers, further reducing consumption of computational, network, and memory resources.

Figure 7:
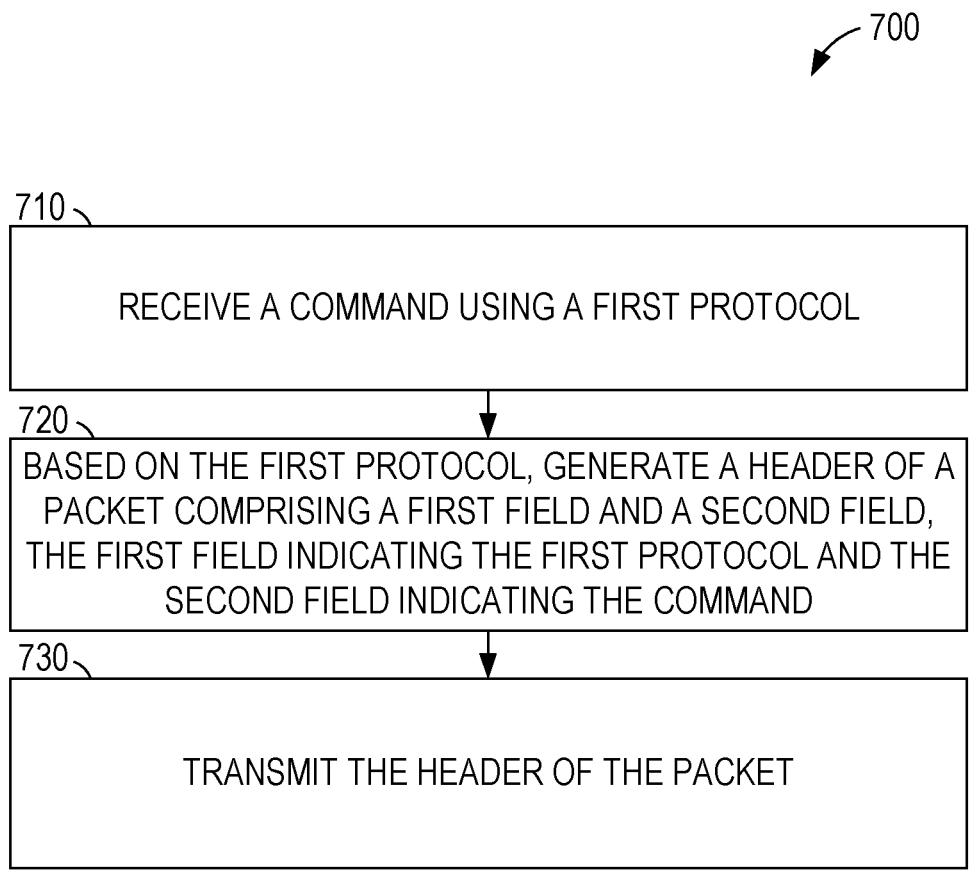
FIG. 7 is a flow chart showing operations of a method performed by a circuit in generating a header of a packet that supports multiple protocols, in accordance with some embodiments of the present disclosure.

FIG. 7 is a flow chart showing operations of a method performed by a circuit in generating a header of a packet that supports multiple protocols, in accordance with some embodiments of the present disclosure. The method 700 includes operations 710, 720, and 730. By way of example and not limitation, the method 700 is described as being performed by the devices of FIGS. 1-3, using the data packet of FIG. 4. The method 700 may be performed by a transmitting device in conjunction with a receiving device performing method 500 or method 600.

In operation 710, a circuit (e.g., a hardware transceiver of the chiplet 310A of FIG. 3) receives a commend using a first protocol. For example, the command may be received using a proprietary signaling protocol within the chiplet 310A or an AXI protocol from an AXI device connected to the circuit.

Based on the first protocol, in operation 720, the circuit generates a header of a packet. The header includes a first field that indicates the first protocol and a second field that indicates the command. For example, the header comprising fields 405-475 of FIG. 4 may be generated, wherein the BYTPE field 470 indicates the first protocol and the command field 430 or the extended command field 475 indicates the command.

In operation 730, the circuit transmits the header of the packet. The header is followed by the remainder of the packet, if any. For example, a write command header indicates the address to be written to and the body of the packet indicates the data to be written, but a read command header indicates the address to be read without being followed by additional data.

Thus, by use of the method 700, data packets of multiple protocols are enabled to be transmitted across a network with minor modifications to the packet header. This enables existing devices that support different protocols to communicate without requiring complete encapsulation of data packets of one format to comply with the network protocol. As a result, computational, network, and memory resources are saved, reducing latency and power consumption.

Figure 8:
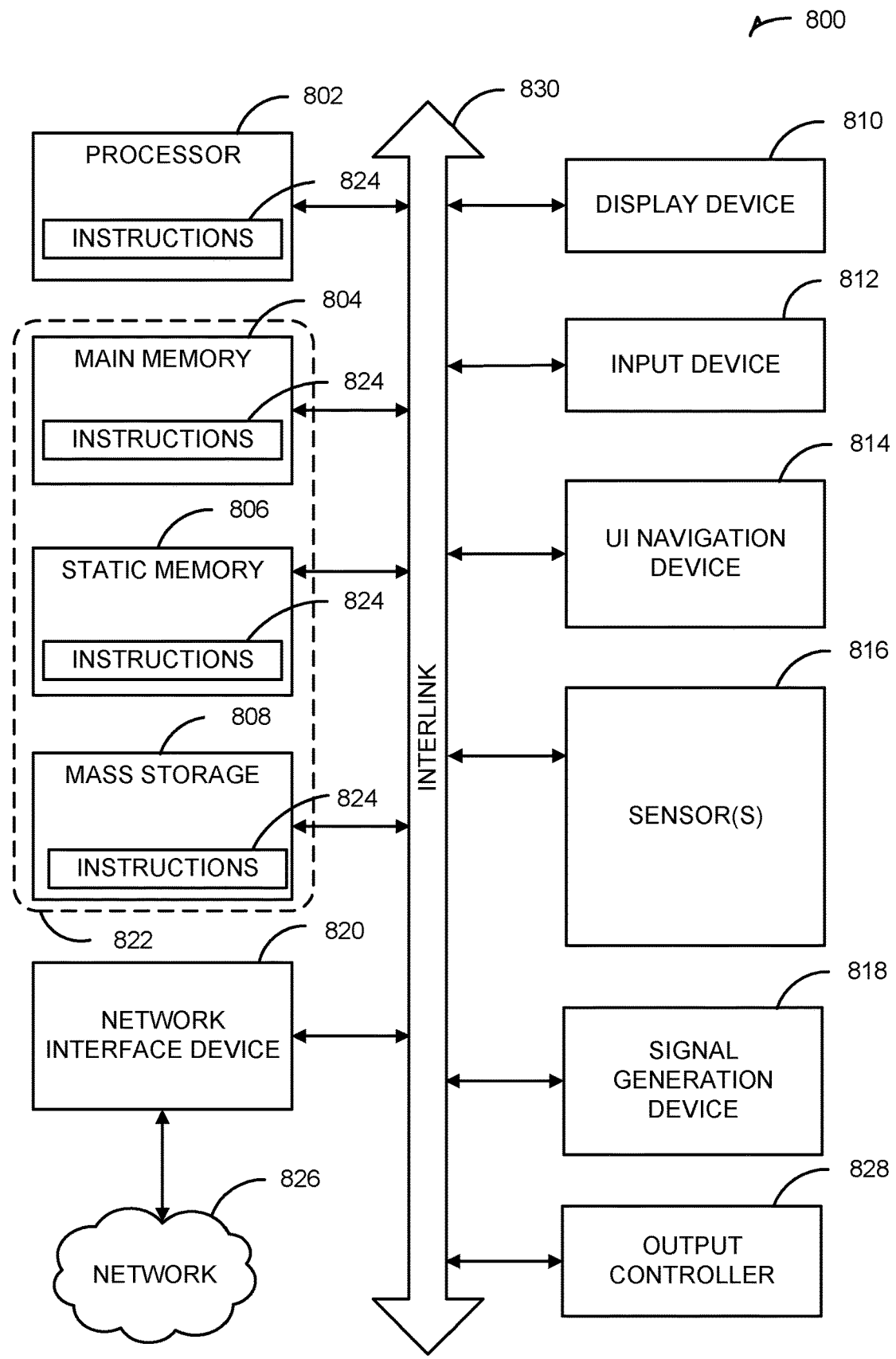
FIG. 8 is a block diagram of an example computer system in which embodiments of the present disclosure may operate.

FIG. 8 illustrates a block diagram of an example machine 800 with which, in which, or by which any one or more of the techniques (e.g., methodologies) discussed herein can be implemented. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 can include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drives, tape drives, flash storage, or other block devices), some or all of which can communicate with each other via an interlink (e.g., bus) 830. The machine 800 can further include a display unit 810, an alphanumeric input device 812 (e.g., a keyboard), and a user interface (UI) navigation device 814 (e.g., a mouse). In an example, the display unit 810, input device 812, and UI navigation device 814 can be a touch screen display. The machine 800 can additionally include a signal generation device 818 (e.g., a speaker), a network interface device 820, and one or more sensors 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 can be, or include, a machine readable medium 822 on which is stored one or more sets of data structures or instructions 824 (e.g., software) embodying or utilized by any one or more of the techniques or functions described herein. The instructions 824 can also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 can constitute the machine readable media 822. While the machine readable medium 822 is illustrated as a single medium, the term "machine readable medium" can include a single medium or multiple media (e.g., a centralized or distributed database, or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and compact disc read only memory (CD-ROM) and digital versatile disc read only memory (DVD-ROM) disks.

In an example, information stored or otherwise provided on the machine readable medium 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine readable medium 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine readable medium 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

In the foregoing specification, some example implementations of the disclosure have been described. It will be evident that various modifications can be made thereto without departing from the broader scope and spirit of the disclosure as set forth in the following claims. The specification and drawings are, accordingly, to be regarded in an illustrative sense rather than in a restrictive sense. Below is a non-exhaustive list of examples of implementations of the present disclosure.

Example 1 is a system comprising: a memory device; a memory controller connected to the memory device; and logic configured to perform operations comprising: receiving a header of a packet, the header comprising a first field and a second field; based on the first field, determining a protocol of the packet; and based on the protocol and the second field, determining a command indicated by the packet.

In Example 2, the subject matter of Example 1 includes, wherein the operations further comprise: based on the protocol and a third field, determining a quality of service for the packet.

In Example 3, the subject matter of Examples 1-2 includes, wherein the operations further comprise: based on the protocol and a third field, determining a protection type for the packet.

In Example 4, the subject matter of Examples 1-3 includes, wherein: the packet is a first packet; the command is a first command; the protocol is a first protocol; and the operations further comprise: processing the first command; receiving a second header of a second packet, the second header comprising a third field and a fourth field; based on the third field, determining a second protocol of the second packet, the second protocol being different than the first protocol; based on the second protocol and the fourth field, determining a second command indicated by the second packet; and processing the second command.

In Example 5, the subject matter of Example 4 includes, wherein: the second field is equal to the fourth field; and the first command is different from the second command.

In Example 6, the subject matter of Examples 4-5 includes, wherein the operations further comprise: based on the first protocol and a fifth field of the first packet, determining a quality of service for the first packet; and based on the second protocol, not determining a quality of service for the second packet.

In Example 7, the subject matter of Examples 4-6 includes, wherein the operations further comprise: based on the first protocol and a fifth field of the first packet, determining a protection type for the first packet; and based on the second protocol, not determining a protection type for the second packet.

In Example 8, the subject matter of Examples 1-7 includes, wherein the operations further comprise: based on the protocol and the command, identifying a virtual channel for the packet.

In Example 9, the subject matter of Examples 1-8 includes, wherein the operations further comprise: based on the protocol, determining a number of flow control units (flits) in the header of the packet.

In Example 10, the subject matter of Examples 1-9 includes, wherein the receiving of the header of the packet comprises: receiving a first flow control unit (flit) comprising a third field; receiving a second flit comprising the first field and the second field; and based on the third field, determining to perform the determining of the protocol of the packet based on the first field.

Example 11 is a method comprising: receiving, by a memory controller, a header of a packet, the header comprising a first field and a second field; based on the first field, determining a protocol of the packet; and based on the protocol and the second field, determining a command indicated by the packet.

In Example 12, the subject matter of Example 11 includes, based on the protocol and a third field, determining a quality of service for the packet.

In Example 13, the subject matter of Examples 11-12 includes, based on the protocol and a third field, determining a protection type for the packet.

In Example 14, the subject matter of Examples 11-13 includes, wherein: the packet is a first packet; the command is a first command; the protocol is a first protocol; and the method further comprises: processing the first command; receiving a second header of a second packet, the second header comprising a third field and a fourth field; based on the third field, determining a second protocol of the second packet, the second protocol being different than the first protocol; based on the second protocol and the fourth field, determining a second command indicated by the second packet; and processing the second command.

In Example 15, the subject matter of Example 14 includes, wherein: the second field is equal to the fourth field; and the first command is different from the second command.

In Example 16, the subject matter of Examples 14-15 includes, based on the first protocol and a fifth field of the first packet, determining a quality of service for the first packet; and based on the second protocol, not determining a quality of service for the second packet.

In Example 17, the subject matter of Examples 14-16 includes, based on the first protocol and a fifth field of the first packet, determining a protection type for the first packet; and based on the second protocol, not determining a protection type for the second packet.

Example 18 is a system comprising: logic of a first chiplet configured to perform operations comprising: receiving a command using a first protocol; based on the first protocol, generating a header of a packet comprising a first field and a second field, the first field indicating the first protocol and the second field indicating the command; and transmitting, to a memory controller, the header of the packet; and logic of the memory controller configured to perform operations comprising: receiving the header of the packet; based on the first field, determining that a protocol of the packet is the first protocol; and based on the determined protocol and the second field, determining the indicated command.

In Example 19, the subject matter of Example 18 includes, wherein the operations further comprise: based on the protocol of the packet being the first protocol and a value of a third field, determining a quality of service for the packet.

In Example 20, the subject matter of Examples 18-19 includes, wherein the operations further comprise: based on the protocol of the packet being the first protocol and a value of a third field, determining a protection type for the packet.

In Example 21, the subject matter of Examples 18-20 includes, wherein: the packet is a first packet; the command is a first command; and the operations further comprise: processing the first command; receiving a second header of a second packet, the second header comprising a third field and a fourth field; based on the third field, determining a second protocol of the second packet, the second protocol being different than the first protocol; based on the second protocol and the fourth field, determining a second command indicated by the second packet; and processing the second command.

In Example 22, the subject matter of Example 21 includes, wherein: the second field is equal to the fourth field; and the first command is different from the second command.

In Example 23, the subject matter of Examples 21-22 includes, wherein the operations further comprise: based on the first protocol and a fifth field of the first packet, determining a quality of service for the first packet; and based on the second protocol, not determining a quality of service for the second packet.

In Example 24, the subject matter of Examples 21-23 includes, wherein the operations further comprise: based on the first protocol and a fifth field of the first packet, determining a protection type for the first packet; and based on the second protocol, not determining a protection type for the second packet.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

What is claimed is:

1. A system comprising:
    a memory device;
    a memory controller connected to the memory device and comprising logic configured to perform operations comprising:
        receiving a command using a first protocol;
        based on the command, determining a number of first flow control units (flits) for a header of a packet that comprises a first field, a second field, and a third field;
        generating the header of the packet, the first field indicating that the second field indicates a protocol of the packet, the second field indicating that the protocol of the packet is the first protocol, and the third field having a value based on both the command and the first protocol; and
        transmitting the header of the packet.

2. The system of claim 1, wherein the transmitting of the header of the packet comprises:

transmitting a first flit of the header of the packet, the first flit comprising the first field; and transmitting a second flit of the header of the packet, the second flit comprising the second field.

3. The system of claim 2, wherein the transmitting of the header of the packet further comprises:

setting the third field based on a protection type of the packet; and transmitting the second flit.

4. The system of claim 1, wherein:

the packet is a first packet; and the operations further comprise:

transmitting a second header of a second packet, the second header comprising a fifth field and a sixth field, a value of the fifth field being determined based on a second protocol of the second packet that is different from the first protocol, a value of the sixth field being determined based on a second command indicated by the second packet.

5. The system of claim 4, wherein:

the third field is equal to the sixth field; and the command is different from the second command.

6. The system of claim 4, wherein the operations further comprise:

based on the second protocol, not transmitting a quality of service for the second packet.

7. The system of claim 4, wherein the operations further comprise:

based on the second protocol, not transmitting a protection type for the second packet.

8. The system of claim 1, wherein the command includes a memory address.

9. The system of claim 1, wherein the command is a memory command.

10. The system of claim 1, wherein the command is a memory read command.

11. The system of claim 1, wherein the memory controller comprises a memory controller chiplet.

12. The system of claim 1, wherein the command causes an immutably hardware-implemented atomic operation to be performed.

13. The system of claim 1, wherein the command causes a programmed atomic operation to be performed.

14. The system of claim 1, wherein the command causes data from a memory address to be accessed, the accessed data to be modified, and the modified data to be stored at the memory address.

15. A method comprising:

receiving, by a memory controller connected to a memory device, a command using a first protocol;

based on the command, determining a number of first flow control units (flits) for a header of a packet that comprises a first field, a second field, and a third field;

generating, by the memory controller, the header of the packet, the first field indicating that the second field indicates a protocol of the packet, the second field indicating that the protocol of the packet is the first protocol, and the third field having a value based on both the command and the first protocol; and transmitting, by the memory controller, the header of the packet.

16. The method of claim 15, wherein the transmitting of the header of the packet comprises:

transmitting a first flit of the header of the packet, the first flit comprising the first field; and transmitting a second flit of the header of the packet, the second flit comprising the second field.

17. The method of claim 16, wherein the transmitting of the header of the packet further comprises:

setting the third field based on a protection type of the packet; and transmitting the second flit.

18. The method of claim 16, wherein:

the packet is a first packet; and the method further comprises:

transmitting a second header of a second packet, the second header comprising a fifth field and a sixth field, a value of the fifth field being determined based on a second protocol of the second packet that is different from the first protocol, a value of the sixth field being determined based on a second command indicated by the second packet.

19. The method of claim 18, wherein:

the first packet further comprises a third field that indicates a first command;

the third field is equal to the sixth field; and the first command is different from the second command.

20. The method of claim 18, further comprising:

based on the second protocol, not transmitting a quality of service for the second packet.

21. The method of claim 18, wherein the command includes a memory address.

22. The method of claim 18, wherein the command is a memory command.

23. The method of claim 18, wherein the command is a memory read command.

24. The method of claim 15, wherein the receiving, by the memory controller connected to the memory device, of the command using the first protocol comprises receiving, by a memory controller chiplet, the command using the first protocol.

* * * * *